No. 819,651. PATENTED MAY 1, 1906.
H. HARRIS.
DISTRIBUTING BOX FOR MOLTEN MATERIAL.
APPLICATION FILED DEC. 30, 1904.
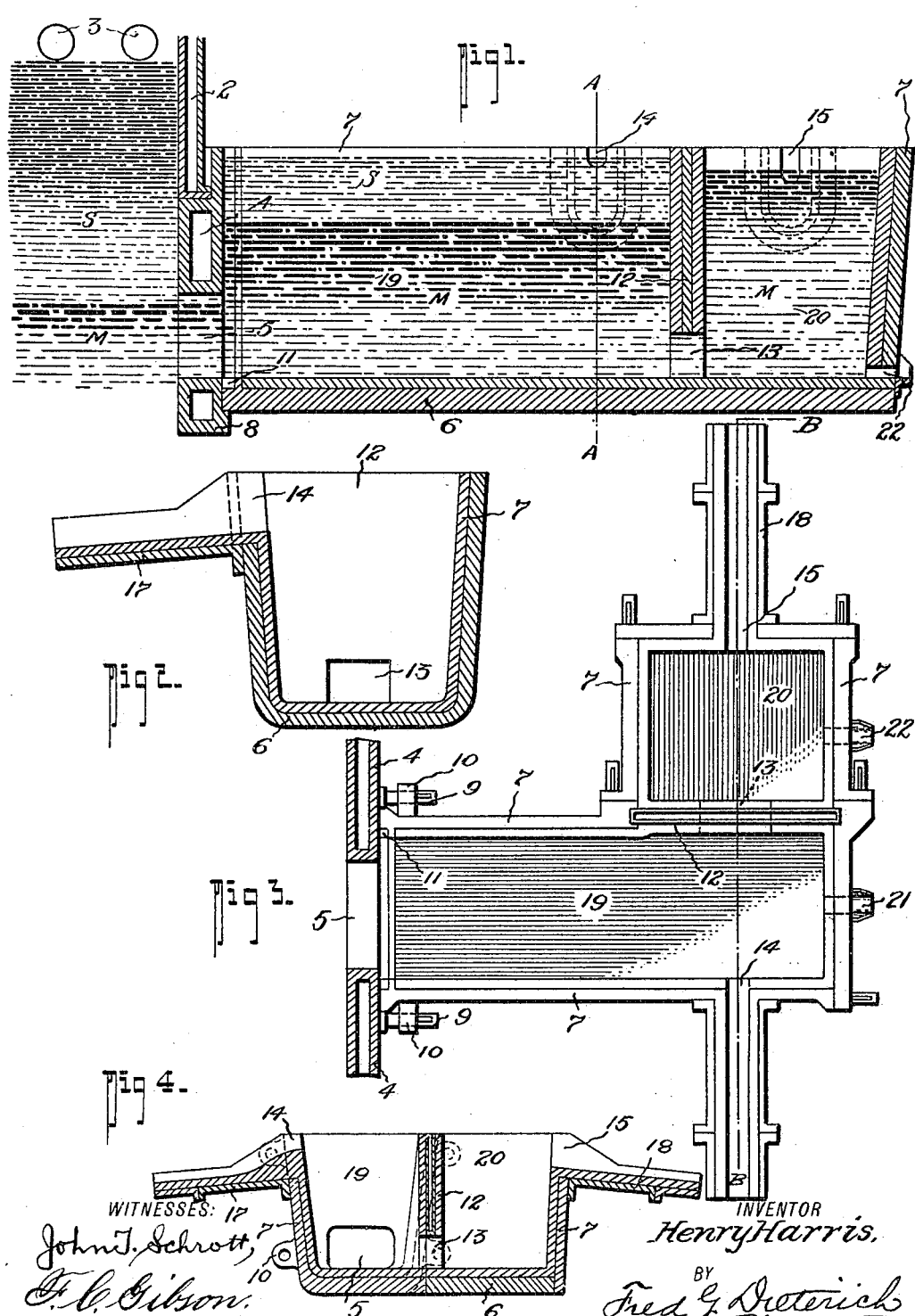
WITNESSES:
John T. Schrott,
F. C. Gibson.
INVENTOR
Henry Harris,
BY
Fred G. Dieterich
ATTORNEY

UNITED STATES PATENT OFFICE.

HENRY HARRIS, OF NELSON, CANADA, ASSIGNOR OF ONE-THIRD TO HALL MINING AND SMELTING COMPANY, LIMITED, OF NELSON, CANADA.

DISTRIBUTING-BOX FOR MOLTEN MATERIAL.

No. 819,651.            Specification of Letters Patent.            Patented May 1, 1906.

Application filed December 30, 1904. Serial No. 238,999.

*To all whom it may concern:*

Be it known that I, HENRY HARRIS, a citizen of the Dominion of Canada, residing at the city of Nelson, in the Province of British Columbia, Canada, have invented a new and useful Improvement in Distributing-Boxes for Molten Material, of which the following is a specification.

This invention relates to an improved means whereby two molten materials which have separated themselves in a furnace into well-defined horizontal strata may be withdrawn from the furnace without such separation being disturbed and the two materials may be separately distributed in a continuous flow.

The means has been devised for the withdrawal and distribution of the slag and matte from a smelting-furnace, but is equally applicable to any requirement of withdrawal where similar conditions prevail.

In the operation of smelting as at present practiced the matte and slag which separate themselves in the bottom of the furnace under conditions of heat and quiescence which are favorable to such separation are generally allowed to accumulate and are withdrawn at intervals into a box-like receiver or forehearth, where the matte is allowed to settle and the slag to overflow. The obvious objection to this intermittent tapping of the furnace is that the separation of matte and slag which has been effected in the furnace is disturbed by the outward flow and the mass of matte requires to settle itself again in the receiver, where, the heat being reduced, the matte and slag are consequently less fluid and the operation of separation takes longer and is not so well defined. The rise and fall of the slag-level within the furnace, which is a necessary accompaniment of the intermittent withdrawal of the slag and matte, is also attended with disadvantages well known in the trade, but which need not be enlarged upon in this connection. Although a system of continuous flow has previously been practiced, it has been without any attempt to maintain the separation of the slag and matte existing in the furnace and is consequently open to the objection just referred to that the separation is disturbed by the outflow and requires resettlement under less favorable conditions.

The object of this invention, therefore, has been to avoid the periodic tapping of the furnace and the several disadvantages with which it is attended and to effect the distribution of the slag and matte by a continuous process of withdrawal which will retain the separation which has been favorably effected in the furnace. With such continuous separate flow the slag is freed from metal and the output can be more conveniently dealt with in any approved manner at a considerable saving in attendance. These results are attained by providing a distributing-box which is in free direct communication with the outlet of the furnace and through which the matte and slag are allowed to flow. The walls of this box are deep enough to afford a sufficient head to retain the desired depth of matte and slag within the furnace, and across it is a partition having an aperture at the level of the bottom through which the matte will pass into the second apartment and overflow through a spout provided, while the slag will be retained in the first apartment of the box and will overflow from a similar spout in its upper edge.

The particular construction of my device and the manner of its operation is fully described in the following specification and illustrated in the drawings which accompany it.

Figure 1 is a vertical longitudinal section through the spout, showing its connection to the furnace-outlet; Fig. 2, a cross-section on the line A A in Fig. 1, showing the cross-partition and its aperture; Fig. 3, a plan of the spout, showing an alternative and preferred arrangement of the trough and partition. Fig. 4 is a vertical section on the line B B in Fig. 3.

In the drawings the water-jacketed front wall of the furnace is represented by 2 and the twyers by 3, the matte being indicated by the interrupted lines M and the slag by those S. In this front wall is an outlet water-jacket 4, the aperture 5 of which is much larger than is usually adopted to preclude the possibility of any interruption of the flow by portions of the fuel which may be among the slag. Jointed against the outer face of the outlet water-jacket 4, with its bottom level with the under side of the furnace-aperture 5, is the distributing-box which is the general subject of this application. This box is formed with a bottom 6 and walls 7, the latter being preferably outwardly sloped toward the top. The under-side of the bottom 6 rests on a ledge 8, outwardly projecting from the furnace-outlet water-jacket 4, against the outer face of which it is secured by cottered studs 9 through lugs 10 on the adjacent walls 7 of the box, the joint being tamped with fire-clay in a groove 11 provided. The walls 7 of the box are of sufficient height to afford a head to retain the required depth of matte M and slag S within the furnace to suit the requirements of any particular ore or manner of treatment.

Toward the outer end of the box a partition 12 extends across it, having toward the center and on the level of the bottom of the box an aperture 13, smaller than the outlet-aperture 5 of the furnace. The box is thus divided into two parts 19 and 20, which when the furnace is in full operation are in direct communication with the lower part of the furnace and into the first division 19 of which the slag and matte may flow unchecked, as the upper side of the furnace-aperture 5 is at least above the upper level of the matte within the furnace. The partition 12 will, however, arrest the flow of the slag into the second division 20 of the box, while allowing the matte to flow through the aperture 13 and rise until its head balances those of the matte and slag in the first division of the box or the matte, slag, and blast-pressure in the furnace.

In the walls of each division 19 and 20 of the distributing-box are overflow-outlets 14 and 15, which to permit of variation extend from the upper edge downward about one-third of the box depth, but may be made up with fire-clay to the desired height which any particular ore or treatment may require, and to these overflow-outlets spouts 17 and 18 may be provided.

Level with the bottom of the box in each division 19 and 20 of it are emergency-outlets 21 and 22, through which the entire contents of the box and the furnace may be emptied.

The bottom, the walls, and the partitions of the distributing-box may be lined throughout with fire-brick or fire-clay to retain the heat and preserve the metal of the box from the extreme heat of the molten matte and slag, and where found desirable these parts may be water-jacketed in whole or in part.

The operation of the device in effecting the distribution of matte and slag is so evident as hardly to require an explanation. When the furnace is in full operation, the matte and slag will by the external head afforded by the height of the overflow-outlets in the box-walls be maintained within the furnace at the desired level to obtain satisfactory results from the blast and will there separate themselves under conditions which are favorable to such separation and in this separated state will flow into the distributing-trough. The slag will be arrested by the partition 12 and retained in the first division 19 of the box to overflow at 17, while the matte will flow through the aperture 13 into the second division 20 and will rise therein to the level of its overflow 18.

Fig. 3 shows in plan a modified and preferred arrangement of the divisions of the box, wherein the matte-apartment 20 forms a lateral and removable offset to the part 19, the partition 12 being a water-jacket having fire-brick lining on each side; but the principle of action is the same as has just been described, the arrangement being one of design to bring the respective overflows 17 and 18 within easy manipulation of the operator in front and to bring the emergency tapping-outlet 21 closer to the outlet 5 from the furnace and in the direct line of the flow of matte, so that there will be less likelihood of the matte becoming solidified or frozen and obstructing the aperture. The partition-aperture 13 is also brought into alinement with the overflow-outlet 15, so that more freedom will be afforded the operator in piercing or stopping it when required.

Having now particularly described my invention and the manner of its application and use, I hereby declare that what I claim is—

1. A means for maintaining the separation of two fluid materials of different specific gravities and for separately distributing the same, comprising in combination with a furnace having an outlet-aperture through which materials from the furnace are adapted to pass simultaneously in their separated condition, a trough-shaped receptacle having an open end and adapted to be secured to the furnace over the discharge-aperture thereof with its bottom on the level of the under side of the outlet from the furnace in which the materials have separated, and in free communication with each, a partition across the trough having an aperture through it at the level of the bottom, and an overflow-outlet to each compartment so divided.

2. A means for maintaining the separation of two fluid materials and for distributing them in separate streams, comprising the combination with a furnace having an outlet in which the materials have separated themselves according to their specific gravities, of a trough-shaped receptacle secured over the outlet from the furnace, the bottom of said receptacle being on the level of the under side of said furnace-outlet, a partition across the trough having an aperture through it at the level of the bottom, said aperture being of smaller dimensions than the outlet from the furnace, and an overflow-outlet for each compartment of the trough so divided, said trough and said furnace-outlet being arranged that the separated materials will pass through the furnace-outlet into one compartment of the trough simultaneously while maintaining their separation.

3. A means for maintaining the separation of slag and matte existing in a smelting-furnace and for distributing the materials in a continuous stream through separate spouts, comprising the combination with a furnace having an outlet through which the separated matte and slag is adapted to simultaneously pass, of a trough-shaped receptacle having an open end and secured at such open end to the outer side of the furnace over the outlet-aperture thereof with the bottom of the receptacle on a level with the under side of the outlet from the furnace, the receptacle-walls being sufficiently high to maintain a sufficient head to obtain the desired height of matte and slag within the furnace, a partition arranged across the receptacle having an aperture therethrough at the level of the bottom of the receptacle, and an overflow-outlet in the upper edge of the wall of each compartment of the receptacle so divided.

4. As a means for maintaining the separation of slag and matte existing in a smelting-furnace and for distributing them in separate streams; the combination with the outlet water-jacket of the furnace of an elongated trough-shaped receptacle, the bottom of which is level with the lower side of the outlet of the furnace with which it is thereby placed in free communication, a partition across the trough dividing it into two compartments, said partition having an aperture through it at the level of the bottom of the trough, an overflow-outlet in the upper edge of the wall of each compartment of the trough and an emergency-outlet to each compartment in the level of the bottom, said furnace-outlet being arranged to pass the matte and slag from the furnace into the trough at its bottom and at the end opposite the partition-aperture, simultaneously in their separated condition.

5. In a device of the class described; the combination with the outlet-jacket of a smelter-furnace, of an elongated trough-shaped receptacle removably secured thereto, of a second similarly-shaped receptacle laterally projecting from one side of said trough and having a partition adjacent to its junction, said partition having an aperture at the level of the bottom of the trough, an overflow-outlet to the first compartment in the upper edge of its wall, an emergency-outlet to the first compartment in the level of its bottom and in the end approximately opposite to the outlet from the furnace, an overflow-outlet to the second compartment in the end opposite to the aperture in the partition, and an emergency-outlet in the level of the bottom of the second compartment.

6. In a device of the class described, the combination with a furnace having an outlet-aperture arranged to pass the matte and slag from the furnace in their separated condition, of an elongated trough-shaped receptacle having an opening at one end and adapted to be secured over the outlet of the furnace at said end with its bottom on a level with the bottom of the outlet to receive the separated matte and slag as it passes through the furnace-outlet, said receptacle having a partition dividing it into two compartments, an aperture in said partition of less dimensions than the outlet of the furnace, and an overflow-outlet in the upper edge of the wall of each compartment of the receptacle so divided, the walls of the receptacle projecting upwardly beyond the level of the top of the furnace-outlet, substantially as shown and for the purposes specified.

In testimony whereof I have signed my name to this specification in the presence of two subscribing witnesses.

HENRY HARRIS.

Witnesses:
ROWLAND BRITTAIN,
ELLICE WEBBER.